United States Patent
Her et al.

(10) Patent No.: US 9,843,224 B2
(45) Date of Patent: Dec. 12, 2017

(54) CLOUD CONTROL POWER SOCKET DEVICE WITH DUAL INDICATORS

(71) Applicant: Tatung Technology Inc., Taipei (TW)

(72) Inventors: Yeou-Fwu Her, Taipei (TW); Ming-Yih Lu, Taipei (TW)

(73) Assignee: TATUNG TECHNOLOGY INC., Taipei (TW)

( * ) Notice: Subject to any disclaimer, the term of this patent is extended or adjusted under 35 U.S.C. 154(b) by 206 days.

(21) Appl. No.: 14/738,094

(22) Filed: Jun. 12, 2015

(65) Prior Publication Data
US 2016/0336801 A1 Nov. 17, 2016

(30) Foreign Application Priority Data
May 13, 2015 (CN) ............. 2015 2 0306030 U

(51) Int. Cl.
*H02J 13/00* (2006.01)
*H02J 3/14* (2006.01)

(52) U.S. Cl.
CPC ........ *H02J 13/0079* (2013.01); *H02J 13/001* (2013.01); *H02J 3/14* (2013.01); *Y10T 307/461* (2015.04); *Y10T 307/469* (2015.04); *Y10T 307/477* (2015.04)

(58) Field of Classification Search
None
See application file for complete search history.

(56) References Cited

U.S. PATENT DOCUMENTS

| | | | | |
|---|---|---|---|---|
| 6,445,087 B1* | 9/2002 | Wang | .................. | H01R 25/003 307/139 |
| 2008/0140565 A1* | 6/2008 | DeBenedetti | .......... | G06Q 20/10 705/39 |
| 2010/0079001 A1* | 4/2010 | Lee | .......... | G06F 1/266 307/40 |
| 2010/0096925 A1* | 4/2010 | Lee | .......... | H02J 13/0075 307/38 |
| 2010/0145543 A1* | 6/2010 | Middlemiss | ........... | G06F 1/266 700/295 |
| 2013/0234534 A1* | 9/2013 | Lin | ..................... | H02J 13/0075 307/112 |
| 2015/0001935 A1* | 1/2015 | Balthazar | ................ | G06F 1/266 307/39 |
| 2016/0041573 A1* | 2/2016 | Chen | ...................... | G06F 1/266 700/295 |

* cited by examiner

*Primary Examiner* — Tuan T Lam
(74) *Attorney, Agent, or Firm* — Bacon & Thomas, PLLC

(57) ABSTRACT

A cloud control power socket device includes a housing, a power plug, a first switch device, a second switch device, a socket and a cloud control circuit. The power plug has first and second conductive wires. The first switch device is arranged on the housing. The second switch device is arranged in the housing and has a first end, a second end, and a control end. The socket is connected to the second end of the second switch device and the second conductive wire. The cloud control circuit is connected to the control end of second switch device. The first switch device includes an AC switch; a first indicator having two ends connected to the AC switch and the second conductive wire; and a second indicator having two ends connected to the second conductive wire and the second switch device.

13 Claims, 5 Drawing Sheets

CLOUD CONTROL POWER SOCKET DEVICE WITH DUAL INDICATORS

BACKGROUND OF THE INVENTION

1. Field of the Invention

The present invention relates to a cloud control power socket device and, more particularly, to a cloud control power socket device with dual indicators.

2. Description of Related Art

FIGS. 1 and 2 illustrate the circuit structure and the appearance of a prior power socket device, respectively. As shown, the power socket device includes a housing 11, a power plug 12, a manual switch 13, a neon lamp 14 and the plurality of sockets 15, wherein the power plug 12 is connected to the housing 11 and has conductive wires 121 and 122. The manual switch 13 is provided with a light-penetrable shell 11 and two ends 131 and 132. The end 131 is connected to the conductive wire 121 of power plug 12. The neon lamp 14 is arranged in the light-penetrable shell of the manual switch 13 on the housing 11, and the two ends of the neon lamp 14 are connected to the end 132 of the manual switch 13 and the conductive wire 122 of the power plug 12, respectively. The plurality of sockets 15 are arranged in series on the housing 11, and the two inserting holes 151 and 152 of each socket 15 are connected to the end 132 of manual switch 13 and the conductive wire 122, respectively.

With the above arrangement, when the power plug 12 is inserted into a utility power socket and the manual switch 13 is pressed to cause the two ends 131 and 132 thereof to be conducted with each other, the utility power can be conducted to the plurality of sockets 15 for being supplied to a plurality of electric appliances. At the same time, the neon lamp 14 is lighted on due to current flowing through, so as to indicate the power-on status of the power socket device to the user, as shown in FIG. 2.

With the development of cloud technology, there is a cloud control power socket put in the market for allowing users to control the status of the power socket device at a cloud site. FIGS. 3 and 4 illustrate the circuit structure and the appearance of a prior cloud control power socket. As shown, the cloud control power socket includes a housing 31, a power plug 32, a manual switch 33, a neon lamp 34, a relay 35, a cloud control circuit 36, a power adaptor circuit 37, and a plurality of sockets 38. The power plug 32 is connected to the housing 31 and has conductive wires 321 and 322. The manual switch 33 is arranged on the housing 31. The manual switch 33 has a light-penetrable shell and includes two ends 331 and 332. The end 331 is connected to the conductive wire 31 of the power plug 32. The neon lamp 34 is arranged in the light-penetrable shell of the manual switch 33 on the housing 31. The two ends of the neon lamp 34 are respectively connected to the end 332 of the manual switch 33 and the conductive wire 322 of the power plug 32. The relay 35 is arranged in the housing 31. The relay 35 has two connection ends 351 and 352 and a control end 353. The connection end 351 is connected to the end 332 of the manual switch 33. The control end 353 is connected to the cloud control circuit 36. The plurality of sockets 38 are arranged in series on the housing 31, and the two inserting holes 381 and 382 of each socket 38 are connected to the end 352 of the relay 35 and the conductive wire 322, respectively. The input of the power adaptor circuit 37 is connected to the end 332 of the manual switch 33 and the conductive wire 322, and the output thereof is connected to the cloud control circuit 36.

With the above arrangement, when the power plug 32 is inserted into a utility power socket and the manual switch 33 is pressed to cause the two ends 331 and 332 thereof to be conducted with each other, the utility power can be applied to the power adaptor circuit 37 and converted into DC power for being supplied to the cloud control circuit 36 so that the cloud control circuit 36 is able to receive the command from an external network access point (AP) to thus turn on or off the relay 35, and the neon lamp 34 is also lighted on at the same time due to current flowing through, as shown in FIG. 4. When the cloud control circuit 36 turns on the relay 35, the utility power is supplied to the plurality of sockets 38 for use by multiple electric appliances, and the neon lamp 34 is in a light-on status at this moment. If the cloud control circuit 36 turns off the relay 35, the utility power cannot be supplied to the plurality of sockets 38, but the neon lamp 34 is still in the light-on status at this moment, resulting in that the appearance thereof is the same as that in FIG. 2. Therefore, users on the scene may be confused about the power status of the cloud control power socket, and even encounter an electricity danger. For example, although the cloud control circuit 36 turns on the relay 35, the user mistakenly believes that there is no power supplied to the power socket, and keeps an electric appliance plugged therein to cause the electric appliance to be overheated or even burned out. Alternatively, it is also possible that the cloud control circuit 36 turns off the relay 35 but the user mistakenly believes that there is power supplied to the socket because the neon lamp 34 is in the light-on status, resulting in that the electric appliance plugged in the socket cannot work properly. Therefore, it desired for the aforementioned cloud control power socket device to be improved.

SUMMARY OF THE INVENTION

The object of the present invention is to provide a cloud control power socket device, with which users can clearly understand the power supply status of the sockets.

In one aspect of the present invention, there is provided a cloud control power socket device with dual indicators, which comprises: a housing; a power plug connected to the housing and having a first conductive wire and a second conductive wire for being plugged into a utility power socket; a first switch device arranged on the housing; a second switch device arranged in the housing and having a first end, a second end, and a control end; at least one socket arranged on the housing and having two inserting holes connected to the second end of the second switch device and the second conductive wire, respectively; and a cloud control circuit arranged in the housing and connected to the control end of second switch device, wherein the first switch device includes: an AC switch having a first end and a second end, the first end being connected to the first conductive wire; a first indicator having two ends connected to the second end of the AC switch and the second conductive wire, respectively; and a second indicator having two ends connected to the second conductive wire and the second end of the second switch device, respectively.

In another aspect of the present invention, there is provided a cloud control power socket device with dual indicators, which comprises: a housing; a power plug connected to the housing and having a first conductive wire and a second conductive wire for being plugged into a utility power socket; a cloud control circuit arranged in the housing; a plurality of cloud control power socket units, each including: a first switch device arranged on the housing; a second switch device arranged in the housing and having a first end, a second end, and a control end connected to the cloud control circuit; and a socket arranged on the housing and having two inserting holes connected to the second end of the second switch device and the second conductive wire, respectively, wherein the first switching device includes: an AC switch having a first end and a second end, the first end being connected to the first conductive wire; a first indicator having two ends connected to the second end of the AC switch and the second conductive wire, respectively; and a second indicator having two ends connected to the second conductive wire and the second end of the second switch device, respectively.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
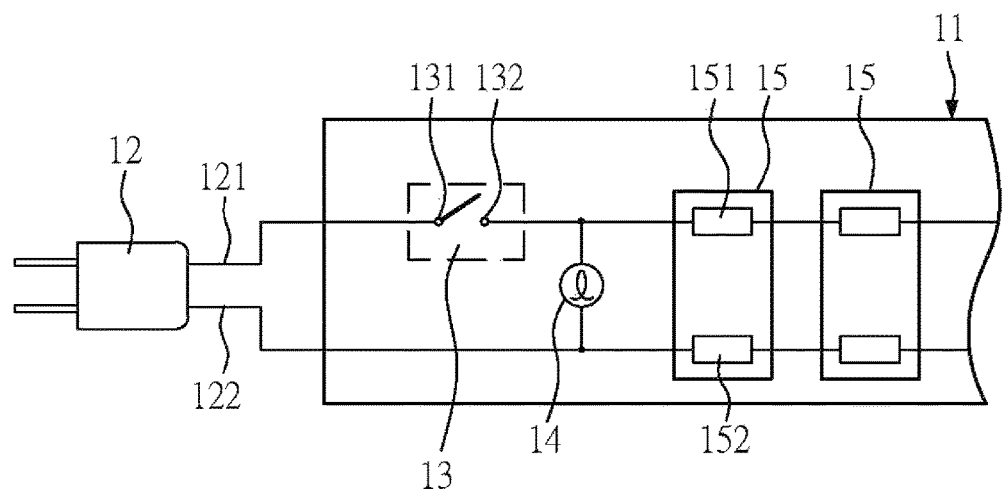
FIG. 1 illustrates the circuit structure of a prior power socket.
Figure 2:
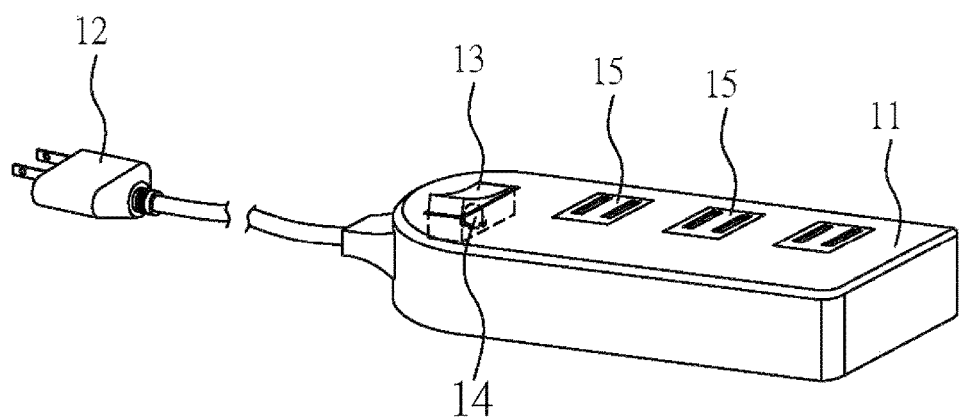
FIG. 2 illustrates the appearance of the prior power socket.
Figure 3:
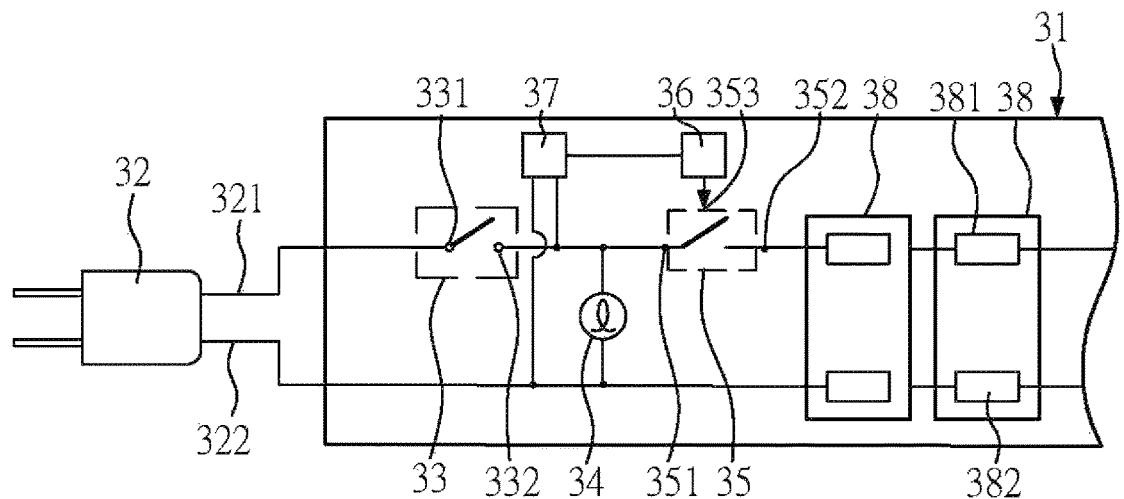
FIG. 3 illustrates the circuit structure of a prior cloud control power socket.
Figure 4:
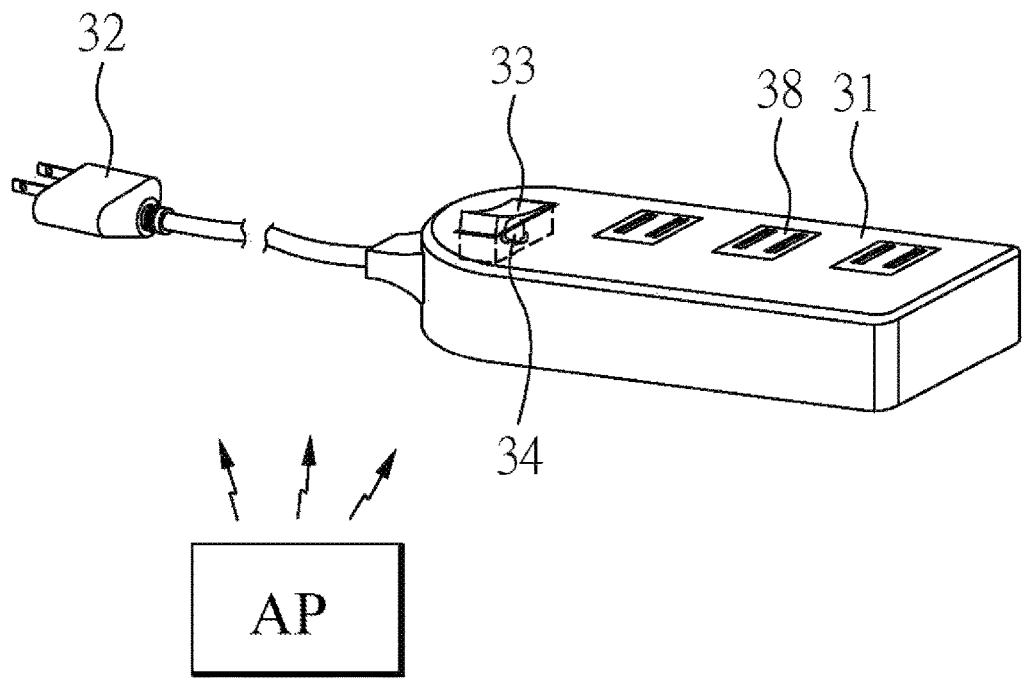
FIG. 4 illustrates the appearance of the prior cloud control power socket.
Figure 5:
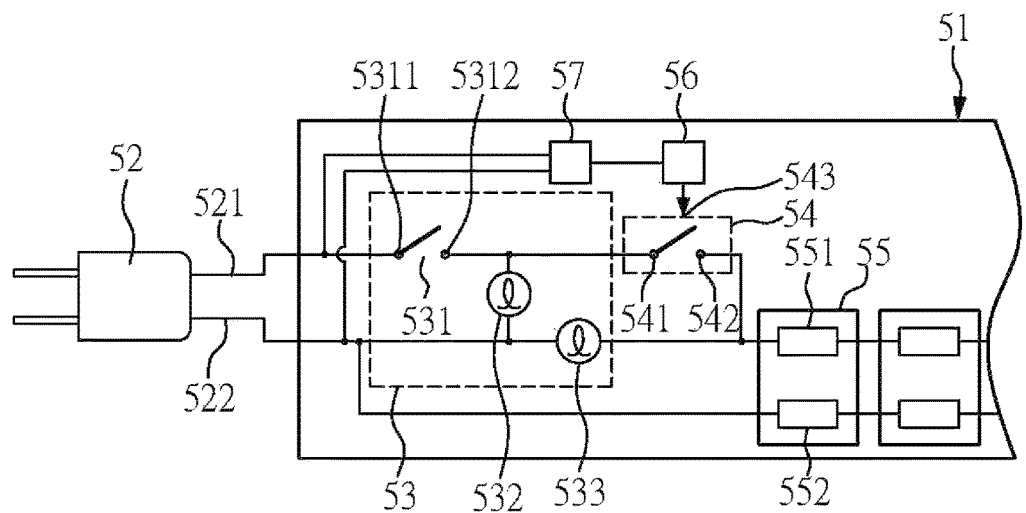
FIG. 5 illustrates the circuit structure of the cloud control power socket device with dual indicators in accordance with a first embodiment of the present invention.
Figure 6:
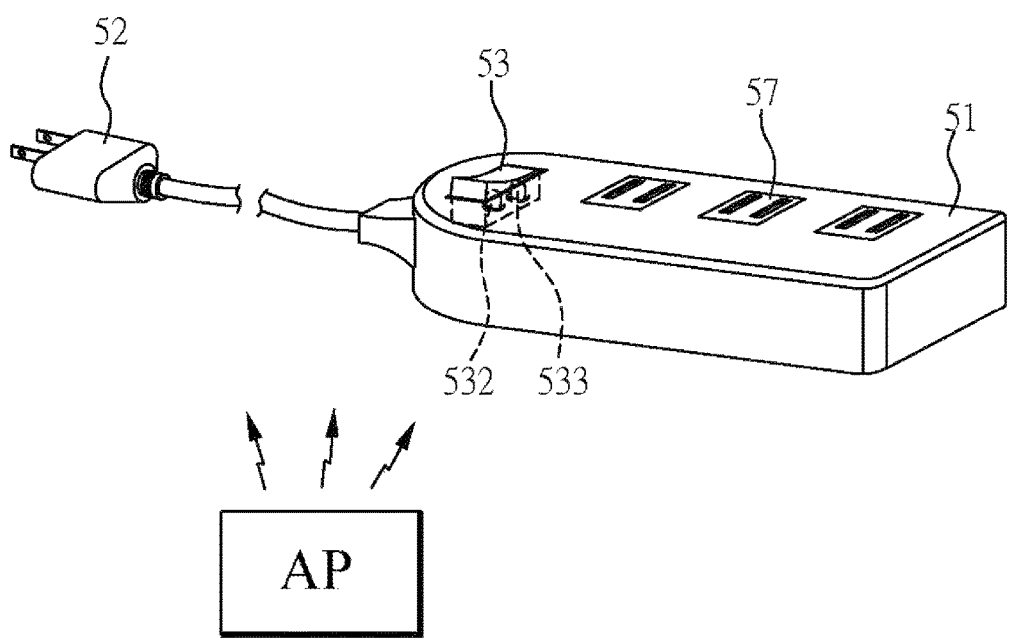
FIG. 6 illustrates the appearance of the cloud control power socket device with dual indicators in accordance with the first embodiment of the present invention.

With reference to FIG. 5 and FIG. 6, there are respectively shown the circuit structure and the appearance of the cloud control power socket device with dual indicators in accordance with a preferred embodiment of the present invention. As shown, the cloud control power socket device with dual indicators includes a housing 51, a power plug 52, a first switch device 53, a second switch device 54, at least one socket 55, a cloud control circuit 56, and a power adaptor circuit 57, wherein the first switch device 53 includes an AC switch 531, a first indicator 532, and a second indicator 533.

The power plug 52 is connected to the housing 51 and has a first conductive wire 521 and a second conductive wire 522. The power plug 52 is provided to be inserted into a utility power socket.

The second switch device 54 is arranged in the housing 51. The second switch device 54 is preferably a relay, which is controlled by the cloud control circuit 56 to be turned on or turned off. The second switch device 54 has a first end 541, a second end 542, and a control end 543.

The first switch device 53 is arranged on the housing 51. Preferably, the first switch device 53 is a manual switch and has a light-penetrable shell. The AC switch 531 of first switch device 53 has a first end and 5311 a second end 5312, wherein the first end 5311 is connected to the first conductive wire 521 of power plug 52, and the second end 5312 is connected to the first end 541 of second switch device 54.

In this embodiment, the first indicator 532 of first switch device 53 is arranged in the light-penetrable shell thereof so that the light of first indicator 532 can penetrate the light-penetrable shell. The first indicator 532 is preferably a neon lamp or an LED lamp, and the two ends thereof are respectively connected to the second end 5312 of the AC switch 531 and the second conductive wire 522.

The two ends of the second indicator 533 of the first switch device 53 are respectively connected to the second conductive wire 522 and the second end 542 of the second switch device 54. In this embodiment, the second indicator 533 is also arranged in the light-penetrable shell of the first switch device 53, so that the light of the second indicator 533 can penetrate the light-penetrable shell. The second indicator 533 is preferably a neon lamp or an LED lamp. In order to clearly identify the first indicator 532 and the second indicator 533, preferably, the first indicator 532 and the second indicator 533 are provided with different colors, or the first indicator 532 and the second indicator 533 are disposed at different positions of the housing 51. For example, the second indicator 533 is arranged in a corresponding opening of the housing 51, so that the light thereof can penetrate the housing 51.

The at least one socket 55 is arranged on the housing 51, and the two inserting holes 551 and 552 thereof are connected to the second end 542 of the second switch device 54 and the second conductive wire 522, respectively. The cloud control circuit 56 is arranged in the housing 51 and connected to the control end 543 of second switch device 54. The input of the power adaptor circuit 57 is connected to the first conductive wire 521 and the second conductive wire 522 and the output thereof is connected to the cloud control circuit 56, so that the utility power can be applied to the power adaptor circuit 57 for being converted into DC power and supplied to the cloud control circuit 56. As a result, the cloud control circuit 56 is able to turn on or off the second switch device 54 in response to commands received from the external network access point (AP).

With the aforementioned cloud control power socket device with dual indicators, when the power plug 52 is plugged into a utility power socket and the first switch device 53 is pressed to cause the two ends 5311 and 5312 of the AC switch 531 to be conducted with each other, the first indicator 532 is lighted on due to current flowing through, which only indicates that the cloud control power socket device with dual indicators has been connected to the utility power. At this moment, if the cloud control circuit 56 turns on the second switch device 54, the utility power is conducted to the at least one socket 55 for supplying power to at least one electric appliance, and the second indicator 533 is also lighted on due to current flowing through, such that users on the scene can be aware of the at least one socket 55 being powered on by observing that the first indicator 532 and the second indicator 533 are both lighted on. On the contrary, if the cloud control circuit 56 turns off the second switch device 54, the utility power cannot be conducted to the at least one socket 55 and thus, at this moment, the second indicator 533 is not lighted on as there is no current flowing through, so that users can be aware of the at least one socket 55 being powered off by observing that the second indicator 533 is extinguished.

Figure 7:
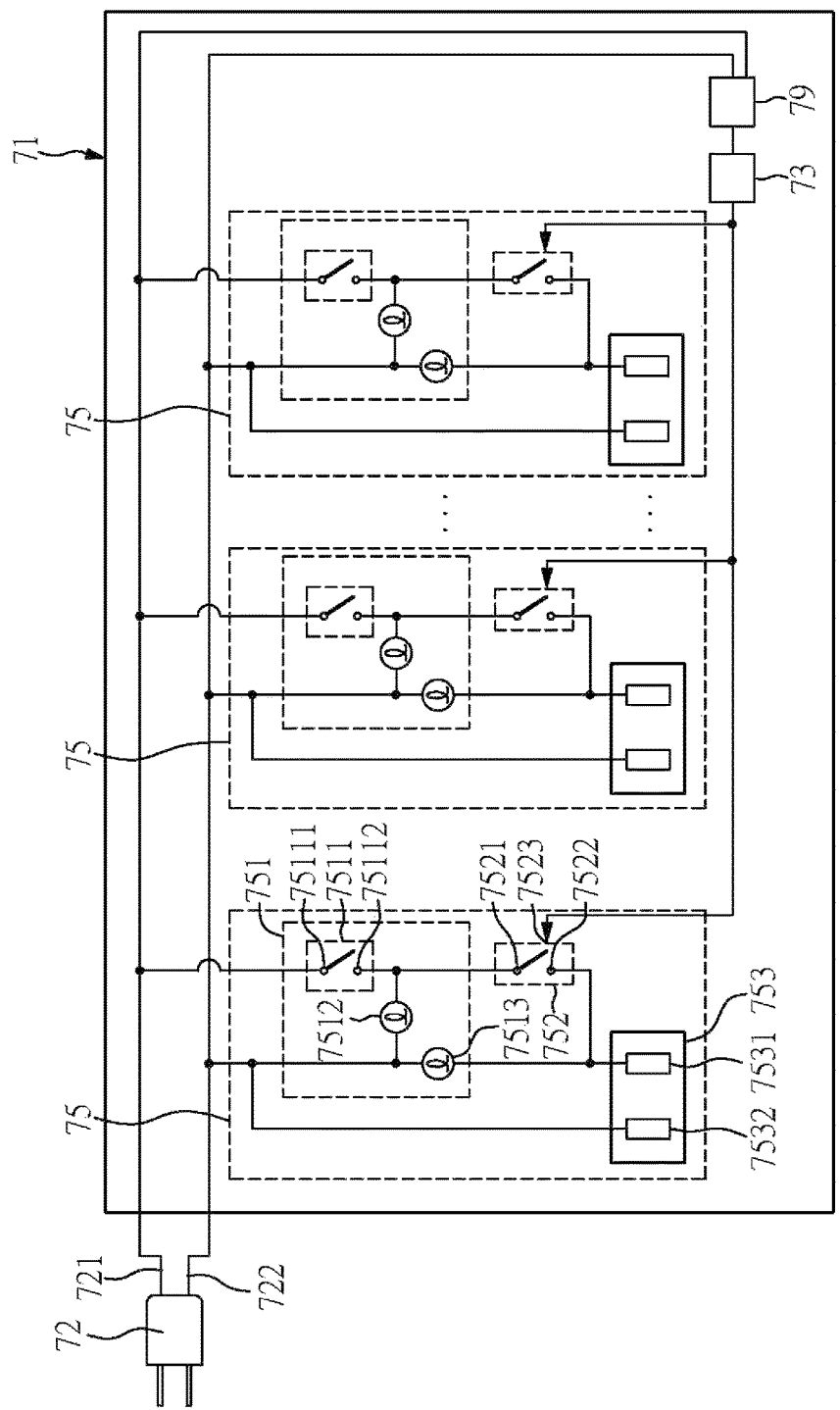
FIG. 7 illustrates the circuit structure of the cloud control power socket device with dual indicators in accordance with a second embodiment of the present invention.
Figure 8:
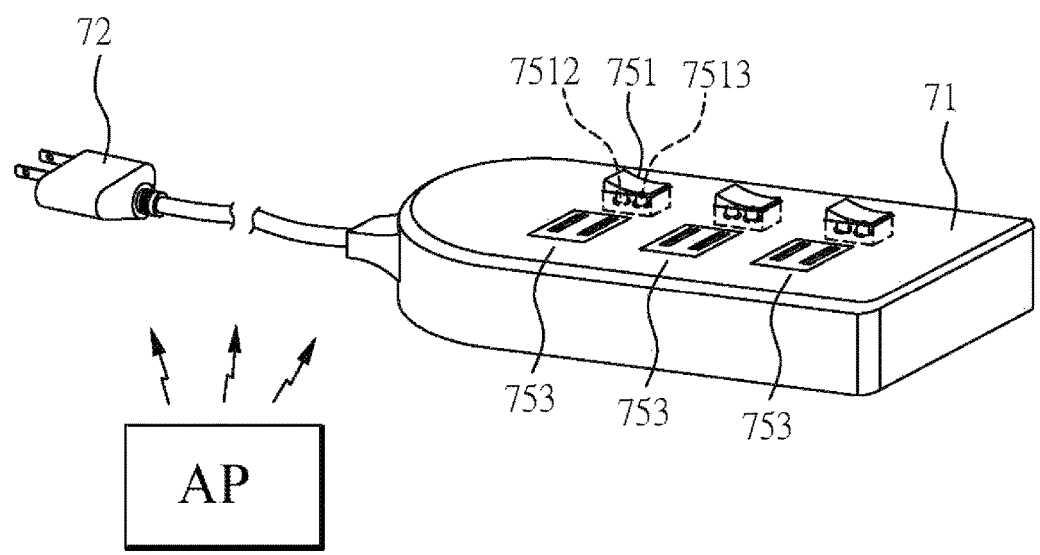
FIG. 8 illustrates the appearance of the cloud control power socket device with dual indicators in accordance with the second embodiment of the present invention.

With reference to FIGS. 7 and 8, there are respectively shown the circuit structure and the appearance of the cloud control power socket device with dual indicators in accordance with another preferred embodiment of the present invention. As shown, the cloud control power socket device with dual indicators includes a housing 71, a power plug 72, a cloud control circuit 73, a power adaptor circuit 79, and plurality of cloud control power socket units 75. The power plug 72 is connected to the housing 71 and has a first conductive wire 721 and a second conductive wire 722. The power plug 72 is provided to be inserted into a utility power socket. The cloud control circuit 73 is arranged in the housing 71 and connected to each cloud control power socket unit 75. The power adaptor circuit 79 is arranged in the housing 71. The input of the power adaptor circuit 79 is connected to the first conductive wire 721 and the second conductive wire 722, and the output thereof is connected to the cloud control circuit 73, such that, when the power plug 72 is plugged into a utility power socket, the utility power can be conducted to the power adaptor circuit 79 for being converted into DC power and supplied to the cloud control circuit 73. As a result, the cloud control circuit 73 is able to control the power supply status of each cloud control power socket unit 75 in response to commands received from the external network access point (AP).

Each of the cloud control power socket units 75 includes: a first switch device 751, a second switch device 752, and a socket 753, wherein the first switch device 751 includes an AC switch 7511, a first indicator 7512, and a second indicator 7513.

The second switch device 752 is arranged in the housing 71. The second switch device 752 is preferably a relay, which is controlled by the cloud control circuit 73 to be turned on or off. The second switch device 752 has a first end 7521, a second end 7522, and a control end 7523.

The first switch device 751 is arranged on the housing 71. Preferably, the first switch device 751 is a manual switch and has a light-penetrable housing. The AC switch 7511 of first switch device 751 has a first end 75111 and a second end 75112. The first end 75111 is connected to the first conductive wire 721 of the power plug 72, and the second end 75112 is connected to the first end 7521 of second switch device 752.

In this embodiment, the first indicator 7512 of first switch device 751 is arranged in the light-penetrable shell, so that the light of first indicator 7512 can penetrate the light-penetrable shell. The first indicator 7512 is preferably is a neon lamp or an LED lamp, and the two ends thereof are connected to the second end 75112 of the AC switch 7511 and the second conductive wire 722, respectively.

The two ends of the second indicator 7513 of first switch device 751 are connected to the second conductive wire 722 and the second end 7522 of the second switch device 752, respectively. In this embodiment, the second indicator 7513 is also arranged in the light-penetrable shell of the first switch device 751 and thus the light of second indicator 7513 can penetrate the light-penetrable shell. The second indicator 7513 is preferably a neon lamp or an LED lamp. In order to clearly identify the first indicator 7512 and the second indicator 7513, preferably, the first indicator 7512 and the second indicator 7513 are provided with different colors, or the first indicator 7512 and the second indicator 7513 are disposed at different positions of the housing 71. For example, the second indicator 7513 is arranged in a corresponding opening of the housing 71, so that the light thereof can penetrate the housing 71.

The socket 753 is arranged on the housing 71, and the two inserting holes 7531 and 7532 thereof are connected to the second end 7522 of the second switch device 752 and the second conductive wire 722, respectively.

The cloud control circuit 73 is connected to the control end 7523 of the second switch device 752 of each cloud control power socket unit 75. The cloud control circuit 73 turns on or off the second switch device 752 in response to commands received from the external network access point (AP).

With the aforementioned cloud control power socket device with dual indicators, when the power plug 72 is plugged into a utility power socket and the first switch device 751 is pressed to cause the two ends 75111 and 75112 of the AC switch 7511 to be conducted with each other, the first indicator 7512 is lighted on due to current flowing through, which only indicates that the cloud control power socket device with dual indicators has been connected to the utility power. At this moment, if the cloud control circuit 56 turns on the second switch device 752, the utility power is conducted to the corresponding socket 753 for supplying power to at least one electric appliance, and the second indicator 7513 is also lighted on due to current flowing through, such that users on the scene can be aware of the corresponding socket 753 being powered on by observing that the first indicator 7512 and the second indicator 7513 are both lighted on. On the contrary, if the cloud control circuit 73 turns off the second switch device 752, the utility power cannot be conducted to the corresponding socket 753 and thus, at this moment, the second indicator 7513 is not lighted on as there is no current flowing through, so that users can be aware of the corresponding socket 753 being powered off by observing that the second indicator 7513 is extinguished.

In view of the forgoing, it is known that, in the present invention, there are indicators arranged on the cloud control power socket to respectively indicate the on/off status of the manual switch and the cloud control switch, so that users can be clearly aware of the power supply status of the socket without the possibility of making misjudgment, so as to achieve convenience and safety in electricity power usage.

Although the present invention has been explained in relation to its preferred embodiment, it is to be understood that many other possible modifications and variations can be made without departing from the spirit and scope of the invention as hereinafter claimed.

What is claimed is:

1. A cloud control power socket device with dual indicators, comprising:
   a housing;
   a power plug connected to the housing and having a first conductive wire and a second conductive wire for being plugged into a utility power socket;
   a first switch device arranged on the housing;
   a second switch device arranged in the housing and having a first end, a second end, and a control end;
   at least one socket arranged on the housing and having two inserting holes connected to the second end of the second switch device and the second conductive wire, respectively; and
   a cloud control circuit arranged in the housing and connected to the control end of second switch device,
   wherein the first switch device includes:
   an AC switch having a first end and a second end, the first end being connected to the first conductive wire;
   a first indicator having two ends connected to the second end of the AC switch and the second conductive wire, respectively; and
   a second indicator having two ends connected to the second conductive wire and the second end of the second switch device, respectively.

2. The cloud control power socket device with dual indicators as claimed in claim 1, wherein the first switch device is a manual switch having a light-penetrable shell, and the first indicator and the second indicator are disposed such that light of the first indicator and the second indicator can penetrate the light-penetrable shell.

3. The cloud control power socket device with dual indicators as claimed in claim 1, wherein the second switch device is a relay, which is controlled by the cloud control circuit to be turned on or turned off.

4. The cloud control power socket device with dual indicators as claimed in claim 1, wherein the first indicator and the second indicator are each a neon lamp or an LED lamp.

5. The cloud control power socket device with dual indicators as claimed in claim 4, wherein the first indicator and the second indicator are provided with different colors.

6. The cloud control power socket device with dual indicators as claimed in claim 4, wherein the first indicator and the second indicator are arranged at different positions of the housing.

7. The cloud control power socket device with dual indicators as claimed in claim 1, further comprising a power adaptor circuit having an input connected to the first conductive wire and the second conductive wire, and an output connected to the cloud control circuit, so as to supply power to the cloud control circuit.

8. A cloud control power socket device with dual indicators, comprising:
 a housing;
 a power plug connected to the housing and having a first conductive wire and a second conductive wire for being plugged into a utility power socket;
 a cloud control circuit arranged in the housing;
 a plurality of cloud control power socket units, each including:
 a first switch device arranged on the housing;
 a second switch device arranged in the housing and having a first end, a second end, and a control end connected to the cloud control circuit; and
 a socket arranged on the housing and having two inserting holes connected to the second end of the second switch device and the second conductive wire, respectively,
 wherein the first switching device includes:
 an AC switch having a first end and a second end, the first end being connected to the first conductive wire;
 a first indicator having two ends connected to the second end of the AC switch and the second conductive wire, respectively; and
 a second indicator having two ends connected to the second conductive wire and the second end of the second switch device, respectively.

9. The cloud control power socket device with dual indicators as claimed in claim 8, wherein the first switch device is a manual switch having a light-penetrable shell, and the first indicator and the second indicator are disposed such that light of the first indicator and the second indicator can penetrate the light-penetrable shell.

10. The cloud control power socket device with dual indicators as claimed in claim 8, wherein the second switch device is a relay, which is controlled by the cloud control circuit to be turned on or turned off.

11. The cloud control power socket device with dual indicators as claimed in claim 8, wherein the first indicator and the second indicator are each a neon lamp or an LED lamp.

12. The cloud control power socket device with dual indicators as claimed in claim 11, wherein the first indicator and the second indicator are provided with different colors.

13. The cloud control power socket device with dual indicators as claimed in claim 8, further comprising a power adaptor circuit having an input connected to the first conductive wire and the second conductive wire, and an output connected to the cloud control circuit, so as to supply power to the cloud control circuit.

\* \* \* \* \*